United States Patent
Armitage et al.

(10) Patent No.: US 11,221,870 B2
(45) Date of Patent: *Jan. 11, 2022

(54) AGENT FLOW ARRANGEMENT MANAGEMENT

(71) Applicant: International Business Machines Corporation, Armonk, NY (US)

(72) Inventors: Joshua H. Armitage, Ellenbrook (AU); Michael P. Clarke, Ellenbrook (AU); John A. W. Kaputin, Rockingham (AU); King-Yan Kwan, Perth (AU); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/292,987

(22) Filed: Mar. 5, 2019

(65) Prior Publication Data

US 2019/0196863 A1 Jun. 27, 2019

Related U.S. Application Data

(63) Continuation of application No. 15/496,155, filed on Apr. 25, 2017, now Pat. No. 10,261,825.

(51) Int. Cl.
*G06F 9/46* (2006.01)
*G06F 11/14* (2006.01)
*G06F 11/34* (2006.01)

(52) U.S. Cl.
CPC .......... *G06F 9/466* (2013.01); *G06F 11/1471* (2013.01); *G06F 11/1474* (2013.01); *G06F 11/3409* (2013.01); *G06F 2201/84* (2013.01)

(58) Field of Classification Search
CPC .. G06F 9/466; G06F 11/1471; G06F 11/1474; G06F 11/3409; G06F 2201/84
See application file for complete search history.

(56) References Cited

U.S. PATENT DOCUMENTS 6,457,041 B1 9/2002 Hutchison
7,712,096 B2 5/2010 Kaczynski et al.
(Continued)

FOREIGN PATENT DOCUMENTS

CN 100375038 C 3/2008

OTHER PUBLICATIONS

Armitage et al., "Agent Flow Arrangement Management," U.S. Appl. No. 16/388,990, filed Apr. 19, 2019.
(Continued)

*Primary Examiner* — Wissam Rashid
(74) *Attorney, Agent, or Firm* — Nathan M. Rau

(57) ABSTRACT

Disclosed aspects relate to agent flow arrangement management in a distributed commit processing environment. A first set of agent utilization data may be collected with respect to a first commit processing agent. A second set of agent utilization data may be collected with respect to a second commit processing agent. An agent flow arrangement may be determined based on a first value with respect to the first set of agent utilization data exceeding a second value with respect to the second set of agent utilization data. The agent flow arrangement may have the first commit processing agent subsequent to the second commit processing agent. The distributed commit operation may be processed using the agent flow arrangement which has the first commit processing agent subsequent to the second commit processing agent.

20 Claims, 8 Drawing Sheets

(56) References Cited

U.S. PATENT DOCUMENTS

| | | | |
|---|---|---|---|
| 9,086,911 B2 | 7/2015 | Mitchell et al. | |
| 2006/0136887 A1* | 6/2006 | Kaczynski | G06F 9/466 |
| | | | 717/151 |
| 2009/0187913 A1* | 7/2009 | Wilkinson | G06F 9/466 |
| | | | 718/103 |
| 2015/0261563 A1* | 9/2015 | Guerin | G06F 9/466 |
| | | | 707/703 |
| 2016/0156587 A1 | 6/2016 | Day | |
| 2016/0162537 A1 | 6/2016 | Mitchell et al. | |
| 2016/0179875 A1 | 6/2016 | Brooks et al. | |

OTHER PUBLICATIONS

List of IBM Patents or Patent Applications Treated as Related, Signed Apr. 19, 2019, 2 pages.

Barnes et al., "Logging Last Resource Optimization for Distributed Transactions in Oracle WebLogic Server," EDBT 10: Proceedings of the 13th International Conference on Extending Database Technology, Mar. 2010, 6 pages, ACM, New York, NY. DOI: 10.1145/1739041.1739119.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Armitage et al., "Agent Flow Arrangement Management," U.S. Appl. No. 15/496,155, filed Apr. 25, 2017.

Armitage et al., "Agent Flow Arrangement Management," U.S. Appl. No. 15/730,181, filed Oct. 11, 2017.

List of IBM Patents or Patent Applications Treated as Related, Signed Mar. 5, 2019, 2 pages.

* cited by examiner

AGENT FLOW ARRANGEMENT MANAGEMENT

BACKGROUND

This disclosure relates generally to computer systems and, more particularly, relates to agent flow arrangement management in a distributed commit processing environment. The amount of recoverable operations that need to be executed in a middleware environment is increasing. As the amount of recoverable operations that need to be executed increases, the need for agent flow arrangement management in a distributed commit processing environment may also increase.

SUMMARY

Aspects of the disclosure relate to selection of potential last agent candidates based on distributed unit of recovery locking, logging, and operational characteristics. Connected systems within a distributed unit of recovery may transmit and receive additional data on the recovery protocols that flow between them. A two-phase commit protocol may be used with one system acting as the overall coordinator at a point in time and the other systems as subordinates to it. One or more metrics may represent a different view of the amount of work required by a system to prepare and then commit recoverable changes. When a commit is processed, the coordinating system may review connected systems and use metric data to determine which system requires more work with respect to preparing and committing changes. The coordinating system may select the system with the greater amount of work as the last agent in the distributed commit. The last agent may only commit its changes rather than both preparing and committing its changes.

Disclosed aspects relate to agent flow arrangement management in a distributed commit processing environment. A first set of agent utilization data may be collected with respect to a first commit processing agent. A second set of agent utilization data may be collected with respect to a second commit processing agent. An agent flow arrangement may be determined based on a first value with respect to the first set of agent utilization data exceeding a second value with respect to the second set of agent utilization data. The agent flow arrangement may have the first commit processing agent subsequent to the second commit processing agent. The distributed commit operation may be processed using the agent flow arrangement which has the first commit processing agent subsequent to the second commit processing agent. Accordingly, a prepare operation may be avoided for the first commit processing agent.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
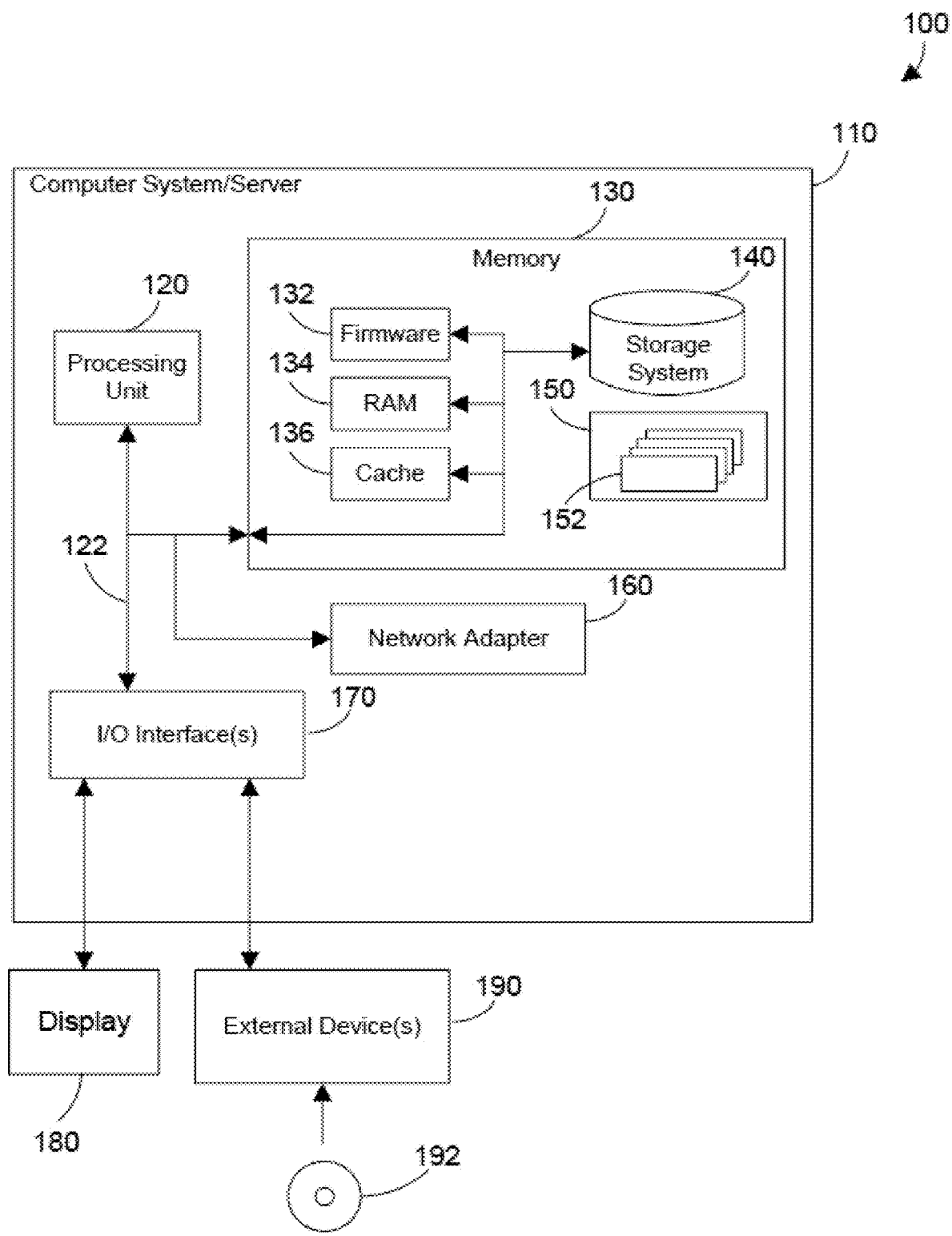
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to selection of potential last agent candidates based on distributed unit of recovery locking, logging, and operational characteristics. Connected systems within a distributed unit of recovery may transmit and receive additional data on the recovery protocols that flow between them. One or more metrics may represent a different view of the amount of work required by a system to prepare and then commit recoverable changes. When a commit is processed, the coordinating system may review connected systems and use metric data to determine which system requires more work with respect to preparing and committing changes. The coordinating system may select the system with the greater amount of work as the last agent in the distributed commit. The last agent may only commit its changes rather than both preparing and committing its changes.

Units of recovery may span multiple systems and represent work that has been distributed between a number of interconnected recovery environments. Distributed units of recovery may require or desire coordination when recoverable changes must be committed. A two-phase commit protocol (2PC) may be used with one system acting as the overall coordinator at a point in time and the other systems as subordinates to it. When a commit point is reached for a distributed unit of recovery spanning interconnected systems, the system that initially processes the 2PC may be the coordinator. The 2PC implementation may involve the coordinating system asking the remaining systems to prepare themselves (to be able to later commit recoverable changes). The coordinator may invoke the last agent optimization by sending only a commit instruction to the final system. In this way, the coordinator role may be passed on to the final system while the original coordinator may become a subordinate to it. The last agent optimization indicates that an unnecessary work flow (e.g., for a prepare) may be avoided. The 2PC implementation may reduce the delay in other units of recovery from being able to modify the same large number of resources changed by the last agent.

Aspects of the disclosure include a method, system, and computer program product for agent flow arrangement management in a distributed commit processing environment. A first set of agent utilization data may be collected with respect to a first commit processing agent. A second set of agent utilization data may be collected with respect to a second commit processing agent. An agent flow arrangement may be determined based on a first value with respect to the first set of agent utilization data exceeding a second value with respect to the second set of agent utilization data. The agent flow arrangement may have the first commit processing agent subsequent to the second commit processing agent. The distributed commit operation may be processed using the agent flow arrangement which has the first commit processing agent subsequent to the second commit processing agent.

In certain embodiments, the first commit processing agent may be arranged as the last agent. The distributed commit operation may be configured to include a prepare operation for the second commit processing agent but not the first commit processing agent. A prepare operation may be avoided for the first commit processing agent. In various embodiments, the set of agent utilization may include a quantity of (past) work performed or a quantity of work expected to be performed. In certain embodiments, the work performed or expected to be performed may include a quantity or volume of recovery log data, a quantity of distinct recoverable changes, a quantity of locks held, a quantity of hardware processor usage, or a combination of these. Altogether, aspects of the disclosure can have performance or efficiency benefits. Aspects may save resources such as bandwidth, disk, processing, or memory. As an example, the 2PC implementation may reduce the response time and memory usage to complete distributed commits. Agent flow arrangement management may arrange the agents in the distributed commit such that the agent requiring a greater amount of work is the last agent. The last agent may commit as opposed to the other agents which may prepare, then commit. Avoiding the prepare operation of the last agent may reduce the response time and memory usage. Other examples of saving resources using agent flow arrangement management may also be possible.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
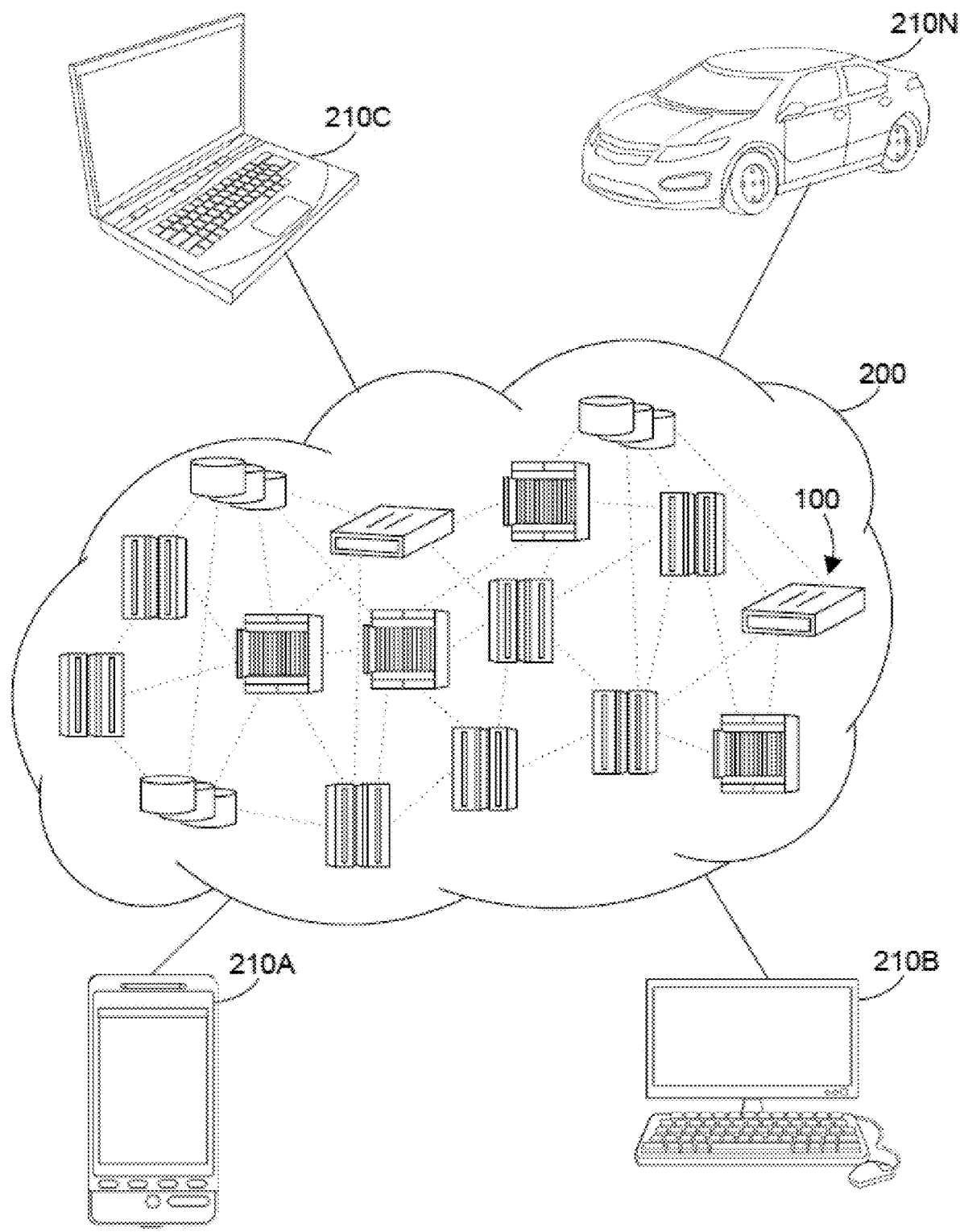
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
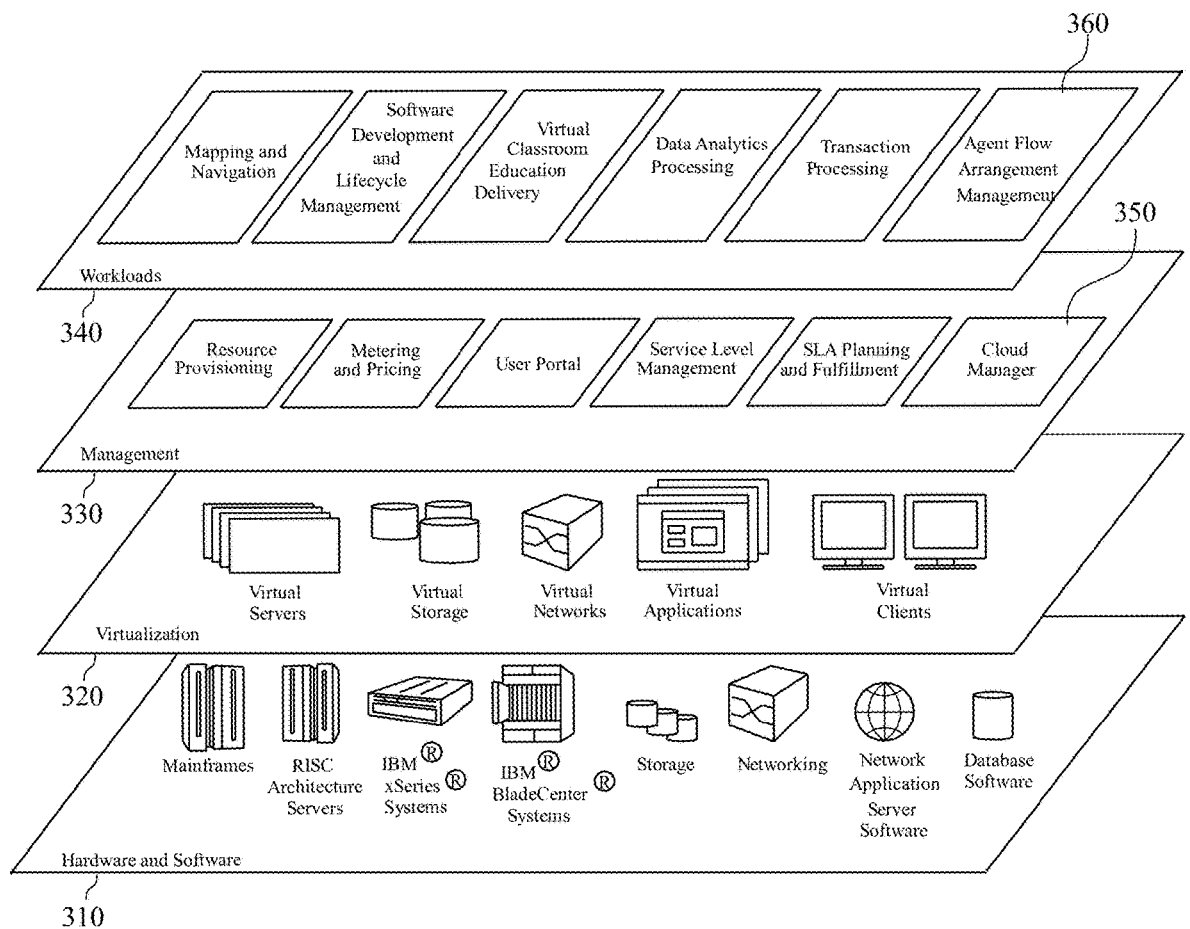
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and agent flow arrangement management 360, which may be utilized as discussed in more detail below.

Figure 4:
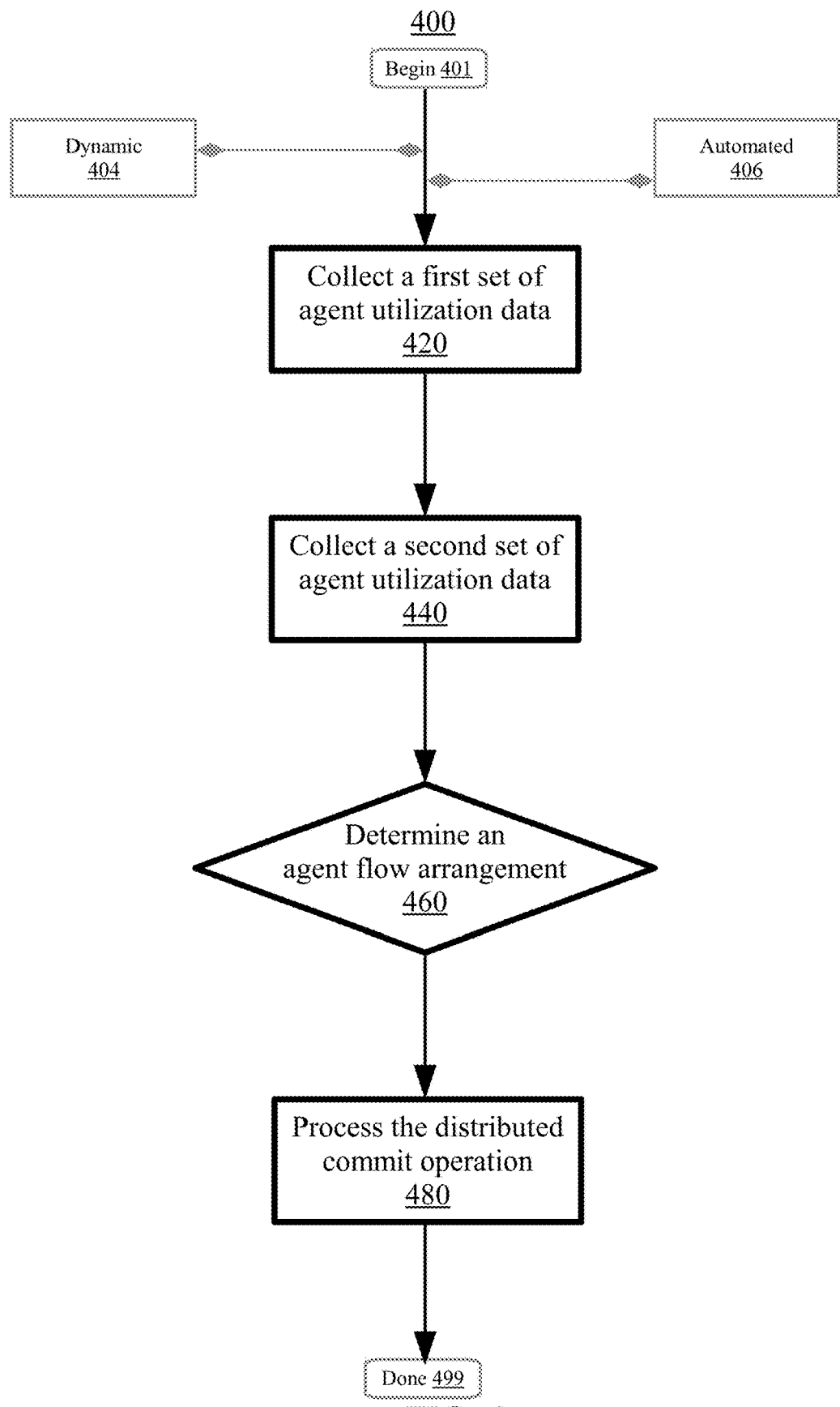
FIG. 4 is a flowchart illustrating a method for agent flow arrangement management in a distributed commit processing environment, according to embodiments.

FIG. 4 is a flowchart illustrating a method for agent flow arrangement management in a distributed commit processing environment, according to embodiments. The distributed commit processing environment may include a Customer Information Control System (CICS), an Information Management System (IMS), a WebSphere Application Server (WAS), or the like. Recoverable operations may be grouped together into logical collections of operations and referred to as units of work or units of recovery. The units of work or recovery may be processed by the recovery management code within the distributed commit processing environment. Changes within a given unit of recovery may be committed or backed out. 2PC may allow systems to communicate with one another and confirm the execution of queries or commands. It may be desired to optimize the selection of a last agent in order to reduce a delay in units of recovery and enhance performance for distributed recovery processing. The agent which requires the most amount of work may be chosen as the last agents. Other agents may prepare while the last agent commits. Once the selected last agent has committed, the other agents in the system may also commit. The method 400 may begin at block 401.

In embodiments, the collecting of a first set of agent utilization data, the collecting of a second set of agent utilization data, the determining, the processing, and the other steps described herein may each be executed in a dynamic fashion at block 404. The steps described herein may be executed in a dynamic fashion to streamline agent flow arrangement management in the distributed commit processing environment. The set of operational steps may occur in real-time, ongoing, or on-the-fly. As an example, one or more operational steps described herein may be carried-out in an ongoing basis to facilitate, promote, or enhance agent flow arrangement management in a distributed commit processing environment. Other examples may also be possible.

In embodiments, the collecting of a first set of agent utilization data, the collecting of a second set of agent utilization data, the determining, the processing, and the other steps described herein may each be executed in an automated fashion at block 406. The steps described herein may be executed in an automated fashion without user intervention. The operational steps may each occur in an automated fashion without user intervention or manual action (e.g., using automated computer machinery, fully machine-driven without manual stimuli). The automated operational steps may be performed by an agent flow arrangement management engine (e.g., as part of a data management system), a cloud management engine (e.g., as part of a cloud environment), or the like.

At block 420, a first set of agent utilization data may be collected. Generally, collecting can include acquiring, obtaining, receiving, attaining, aggregating, accumulating, or gathering. The first set of agent utilization data may include facts, statistics, quantities, or characteristics of a first agent. The first set of agent utilization data may include the number of log records written for the local recoverable resources changed by the system for the first unit of recovery, the volume of log data written for the first unit of recovery, the number of separate locks held for the local recoverable resources, the number of separate recoverable changes made, or the like. Agent utilization data may relate to the first commit processing agent and may include operations, functionalities, or computing resources with respect to the first commit processing agent. Accordingly, connected systems within a distributed unit of recovery may transmit or retrieve additional data on the recovery protocols that flow between them. One or more metrics may represent a different view of the amount of work each system would have to perform when being told to prepare and commit recoverable changes. The collecting may occur in the distributed commit processing environment.

At block 440, a second set of agent utilization may be collected. Generally, collecting can include acquiring, obtaining, receiving, attaining, aggregating, accumulating, or gathering. The second set of agent utilization data may include facts, statistics, quantities, or characteristics of a second agent. The second set of agent utilization data may include the number of log records written for the local recoverable resources changed by the system for the second unit of recovery, the volume of log data written for the second unit of recovery, the number of separate locks held for the local recoverable resources, the number of separate recoverable changes made, or the like. The agent utilization data may relate to the second commit processing agent and may include operations, functionalities, or computing resources with respect to the second commit processing agent. The collecting may occur in the distributed commit processing environment.

Consider the following example. A travel website may utilize an agent flow arrangement management system to assist clients with booking vacations. The travel website may desire an arrangement of agents which may provide their clients with an efficient booking experience. Agent utilization data may be collected for various agents or systems. Two example systems in this environment may include a first system to book hotel rooms and a second system to book airline flights. The hotel room request may need to be sent to seven different websites and the airline booking request may need to be sent to five different websites. Agent utilization data may be collected for both of these systems. As an example, quantities and characteristics of the system computing resources to book hotel rooms may be collected, such as the amount of work required (e.g., volume of log data written). Quantities and characteristics of the system computing resources to book airline flights may be collected, including the amount of work required (e.g., volume of log data written). The agent utilization data for these two systems may be utilized to determine an agent flow arrangement. Other examples of collecting agent utilization data may also be possible.

At block 460, an agent flow arrangement may be determined. Determining can include computing, calculating, formulating, generating, or ascertaining. The agent flow arrangement may include the order in which the units of work or units of recovery may be processed. When a commit is processed, connected systems may be reviewed. The metric data may be used to determine which system requires the most work (e.g., in terms of having to prepare/commit its changes). The determining may occur based on a first value (with respect to the first set of agent utilization data) exceeding a second value (with respect to the second set of agent utilization data). The agent flow arrangement may have the first commit processing agent subsequent to the second commit processing agent. If the amount of work needed to commit a first agent is greater than the amount of work needed to commit a second agent, then the second agent may be arranged to occur before the first agent. The determining may occur to process a distributed commit operation. As an example, a system A may select a system B as the last agent based on the metrics of system B with respect to the amount of work needed as part of the two-phase commit. System A may call systems C and D to prepare before calling system B to commit. In certain embodiments, an agent may require that it is the last agent. This agent may be established as the last agent regardless of the amount of work. In certain specific embodiments, if system A determines that none of the connected systems may be the last agent, then system A may instruct them all to prepare, and then instruct them all to commit (or back out if necessary).

Consider the following example. Once agent utilization data for the hotel booking system and the airline booking system has been collected, an appropriate agent flow arrangement may be determined in advance of processing the distributed commit operation. The metric data for the two systems may be analyzed. A first value (with respect to amount of work) may be determined for the hotel booking system computing resources. The hotel booking system may be awarded a value of 7 (e.g., on a 1-10 scale) for the amount of work required to commit since the request may need to be processed by seven different websites. A second value may be determined for the airline booking system computing resources. The airline booking system may be awarded a value of 5 on the same scale for the amount of work required to commit since the request may need to be processed by five different websites. The first value exceeds the second value. An agent flow arrangement may be determined having the system for booking a hotel room subsequent to the system for booking a flight. The hotel booking system computing resources may be determined as the last agent since it requires a greater amount of work to commit. Other examples of determining an agent flow operation may also be possible.

At block 480, the distributed commit operation may be processed. Generally, processing can include performing, carrying-out, initiating, launching, instantiating, implementing, enacting, running, or executing. The distributed commit operation may include a command for an established last agent to commit. The processing may occur using the agent flow arrangement as described herein. The agent flow arrangement may have the first commit processing agent subsequent to the second commit processing agent. As an example, if the first commit processing agent requires a greater amount of work than the second commit processing agent, the first commit processing agent may be established as the last agent and instructed to commit. The processing may occur in the distributed commit processing environment.

Consider the following example. Once an agent flow arrangement is determined, the distributed commit operation may be processed. The established agent flow arrangement may designate the hotel booking system as the last agent. The distributed commit may be executed. The system for booking a flight may be instructed to prepare, then commit. The system for booking a hotel room may be instructed to commit. The system for booking a flight may prepare. The system for booking a hotel room may commit. The system for booking a flight may commit. The agent flow arrangement may allow for efficient processing and provide the client with reservations for both a flight and a hotel room reservation for their vacation. Other examples of processing the distributed commit operation may also be possible.

Method 400 concludes at block 499. As described herein, aspects of method 400 relate to agent flow arrangement management in a distributed commit processing environment. Aspects of method 400 may provide performance or efficiency benefits related to agent flow arrangement management. Aspects may save resources such as bandwidth, processing, or memory. As an example, processing time may be saved by selecting a first agent as the last agent. If the first agent requires more work in order to be processed (e.g., committed), then the first agent may be selected as the last agent. Preparing other agents (e.g., a second agent) first and then committing the first agent may require less processing time than a different order (e.g., preparing the first agent before committing the second agent). Other methods of saving processing time may also be possible.

Figure 5:
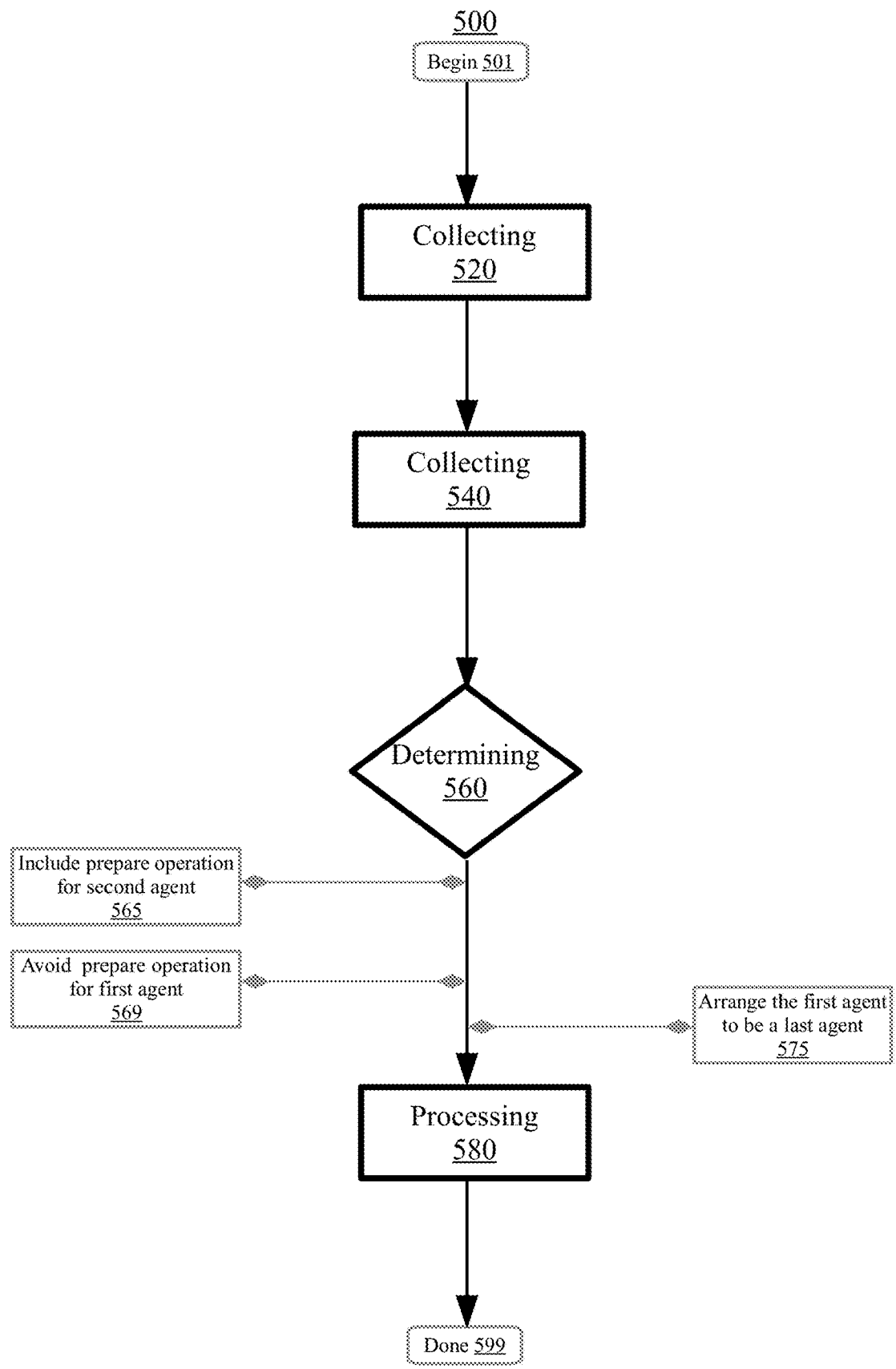
FIG. 5 is a flowchart illustrating a method for agent flow arrangement management in a distributed commit processing environment, according to embodiments.

FIG. 5 is a flowchart illustrating a method for agent flow arrangement management in a distributed commit processing environment, according to embodiments. Aspects may be similar or the same as aspects of method 400, and aspects may be used interchangeably. The method 500 may begin at block 501. At block 520, a first set of agent utilization data may be collected. The collecting may occur with respect to a first commit processing agent. The collecting may occur in the distributed commit processing environment. At block 540, a second set of agent utilization may be collected. The collecting may occur with respect to a second commit processing agent. The collecting may occur in the distributed commit processing environment. At block 560, an agent flow arrangement may be determined. The determining may occur based on a first value (with respect to the first set of agent utilization data) exceeding a second value (with respect to the second set of agent utilization data). The agent flow arrangement may have the first commit processing agent subsequent to the second commit processing agent. The determining may occur to process a distributed commit operation.

In embodiments, the distributed commit operation may be configured at block 565. Configuring can include adapting, setting-up, programming, modifying, or adjusting. The distributed commit operation may be configured to include a prepare operation for the second commit processing agent but not the first commit processing agent. The agent requiring or desiring the most work (e.g., the first commit processing agent) may be selected as the last agent in the distributed commit as described herein. The second commit processing agent may include a prepare operation to assemble, formulate, or ready the second agent for committing. The first commit processing agent may not include a prepare operation. For instance, in the travel website example described herein, the airline booking system computing resources may undergo a prepare operation to ready for committing. The hotel booking system computing resources may not undergo a prepare operation.

In embodiments, a prepare operation for the first commit processing agent may be avoided at block 569. Avoiding can include averting, bypassing, or forgoing. As described herein, the second commit processing agent may include a prepare operation (to ready the second agent for committing). A prepare operation for the first commit processing agent may be avoided due to the first agent requiring or desiring a greater amount of work. The first commit processing agent may only commit (e.g., instead of preparing then committing) to save processing time. As an example, in the travel website example described herein, a prepare operation for the hotel booking system computing resources may be avoided. The hotel booking system computing resources may commit instead of preparing then committing. Other examples may also be possible.

Consider the following example. A large university may utilize an agent flow arrangement management engine in order for thousands of students to register for courses simultaneously. Agent utilization data may be collected for multiple agents within the system. As an example, a first agent may include a system for registering for science classes and a second agent may include a system for registering for math classes. It may be determined that the system for registering for science classes requires more work (e.g., than the system for registering for math classes) in order to commit. An agent flow arrangement may be determined which designates the science class system as the last agent. The distributed commit operation may be configured to include both a prepare and a commit operation for the math class system but only a commit operation for the science class system. A prepare operation may be avoided for the science class system. This configuration may occur in response to the determination that the science class system requires a great amount of work. When the distributed commit operation is processed, the math class system may prepare, the science class system may commit, and the math class system may commit. The established flow arrangement may provide students with an efficient method to register for math and science classes. Other examples of configuring the distributed commit operation may also be possible.

In embodiments, the first commit processing agent may be arranged at block 575. Generally, arranging can include ordering, organizing, sorting, or structuring. The first commit processing agent may be arranged to be a last agent due to the large amount of work required in order to commit. Therefore, the agent requiring the greater amount work may be arranged as the last agent in the distributed commit. The second commit processing agent may prepare. The first commit processing agent may commit (e.g., rather than prepare then commit). The arranging may occur as part of processing the distributed commit operation. The arranging may occur in the agent flow arrangement. As an example, in the travel website example described herein, the hotel booking system computing resources may be arranged as the last agent since this system requires a greater amount of work than the airline booking system computing resources. Other examples may also be possible.

Consider the following example. A ride-sharing application may utilize agent flow arrangement management to allow multiple users to request rides simultaneously. Multiple agents may be used. As an example, one agent may include a system for a user to request a ride while another agent may include a system for a driver to accept a request from a potential rider. Agent utilization data for both systems may be collected, and it may be determined that the driver acceptance system requires a greater amount of work to commit than the rider request system. An appropriate agent flow arrangement may be determined. Since the driver acceptance system requires a greater amount of work, this system may be arranged as the last agent (in the agent flow arrangement). When the operation is processed, the rider request system may prepare, the driver acceptance system may commit, and the rider request system may commit. The established arrangement may efficiently process the operation of matching of a rider with a driver. Other examples of arranging the first commit processing agent to be the last agent may also be possible.

At block 580, the distributed commit operation may be processed. The processing may occur using the agent flow arrangement. The agent flow arrangement may have the first commit processing agent subsequent to the second commit processing agent. The processing may occur in the distributed commit processing environment. Method 500 concludes at block 599. As described herein, aspects of method 500 relate to agent flow arrangement management in a distributed commit processing environment. Aspects of method 500 may provide performance or efficiency benefits related to agent flow arrangement management. Aspects may save resources such as bandwidth, processing, or memory. As an example, memory may be saved by avoiding a prepare operation for the first agent. The first agent (e.g., the agent which requires the larger amount of work) may only commit (e.g., as opposed to prepare then commit). Avoiding the prepare operation for the agent requiring more work may require less memory than preparing that same agent. Other examples of saving memory may also be possible.

Figure 6:
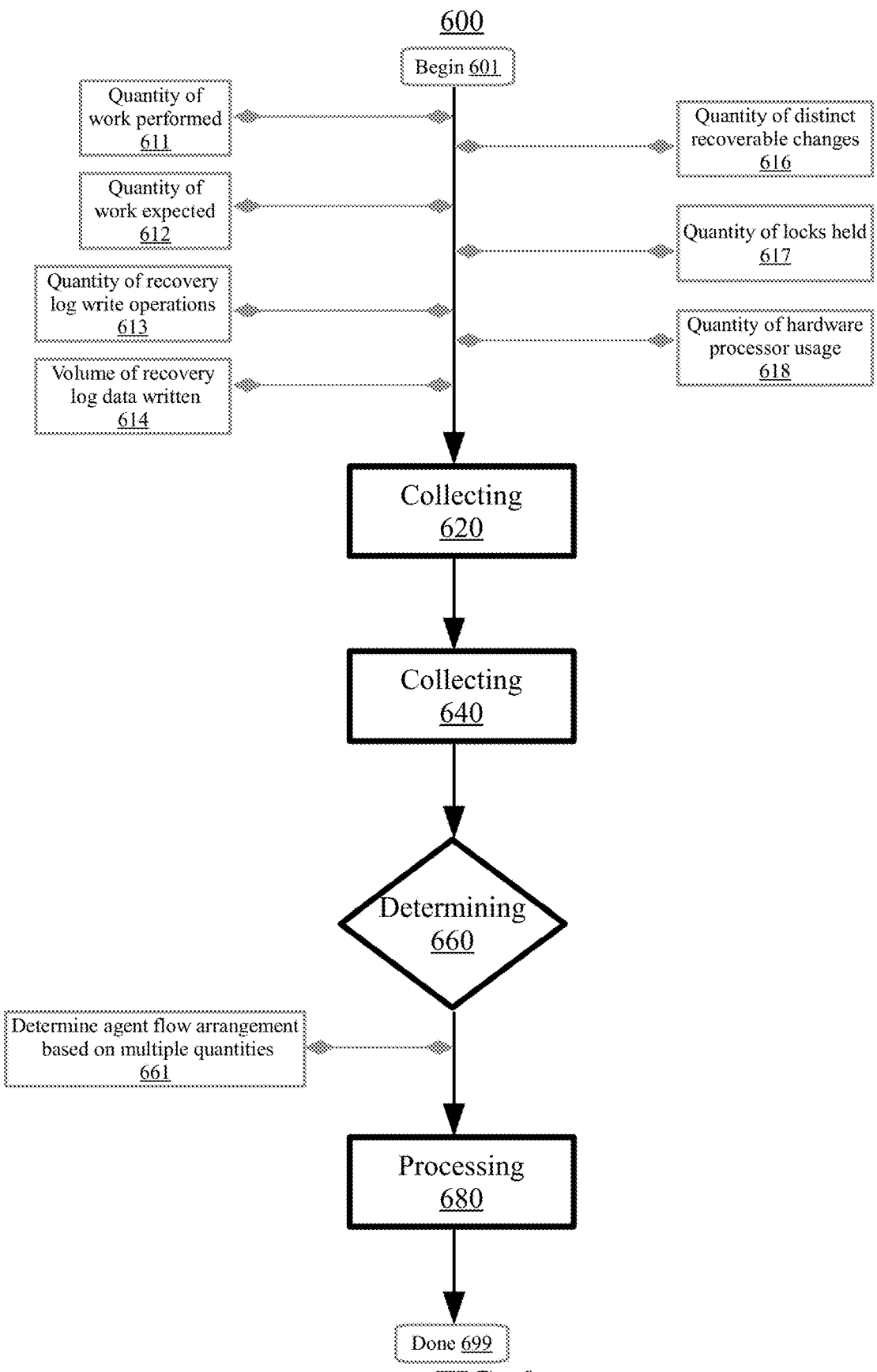
FIG. 6 is a flowchart illustrating a method for agent flow arrangement management in a distributed commit processing environment, according to embodiments.

FIG. 6 is a flowchart illustrating a method for agent flow arrangement management in a distributed commit processing environment, according to embodiments. Aspects may be similar or the same as aspects of method 400/500, and aspects may be used interchangeably. The method 600 may begin at block 601. At block 620, a first set of agent utilization data may be collected. The collecting may occur with respect to a first commit processing agent. The collecting may occur in the distributed commit processing environment. At block 640, a second set of agent utilization may be collected. The collecting may occur with respect to a second commit processing agent. The collecting may occur in the distributed commit processing environment. At block 660, an agent flow arrangement may be determined. The determining may occur based on a first value (with respect to the first set of agent utilization data) exceeding a second value (with respect to the second set of agent utilization data). The agent flow arrangement may have the first commit processing agent subsequent to the second commit processing agent. The determining may occur to process a distributed commit operation. At block 680, the distributed commit operation may be processed. The processing may occur using the agent flow arrangement. The agent flow arrangement may have the first commit processing agent subsequent to the second commit processing agent. The processing may occur in the distributed commit processing environment.

In embodiments, a quantity of work performed may be indicated at block 611. The first set of agent utilization data may be configured to indicate a first quantity of work that has been performed by the first commit processing agent. Generally, configuring can include setting-up, programming, structuring, constructing, adjusting, or modifying. A quantity of work can include an amount or measurement of tasks, jobs, processes, resources utilized, or the like needed or desired to be performed when preparing then committing recoverable changes of an agent. The work can include the number of log records written for the local recoverable resources changed by the system for the agent, the volume of log data written for the agent, the number of separate locks held for the local recoverable resources, the number of separate recoverable changes made, or the like. The quantity of work may indicate or include a historical or past measurement or amount of work (e.g., a historical utilization with respect to a unit of recovery). The second set of agent utilization data may be configured to indicate a second quantity of work that has been performed by the second commit processing agent. The first quantity of work may be compared with the second quantity of work. Comparing can include contrasting, assessing, evaluating, correlating, analyzing, investigating, or examining. It may be calculated that the first quantity of work exceeds the second quantity of work. Calculating can include computing, determining, formulating, or ascertaining. The first quantity of work for the first agent may be greater than the second quantity of work for the second agent. The agent flow arrangement may be determined based on the first quantity of work exceeding the second quantity of work. Determining can include computing, calculating, formulating, generating, or ascertaining. The determining may occur to process the distributed commit operation. Since the first agent required more work to commit, the first agent may be established as the last agent. The second agent may prepare then commit while the first agent may only commit.

Consider the following example. A human resources department for a large company may utilize agent flow arrangement management to retrieve signatures approving a recent hire. As an example, one agent may include a system for collecting approval from the company president while another agent may include a system for collecting approval from head of the department where the new hire will be working. Agent utilization data may be collected for both of these systems. The set of agent utilization data may include a quantity of work that has been performed (e.g., historically). The agent utilization data may be based on historical statistics from the last hired employee. The last time the system was executed, the amount of work to commit agent for the president may have been a 9 (e.g., on a 1-10 scale) while the amount of work to commit the agent for the department head may have been a 6 (e.g., on the same scale). Based on a comparison of the two agents and the two sets of agent utilization data, it may be calculated that the amount of work to commit the agent for the president exceeds the amount of work to commit the agent for the department head. An appropriate agent flow arrangement may be determined. Since the agent for the president historically requires a greater amount of work, this agent may be arranged as the last agent. When the distributed commit operation is processed, the agent for the department head may prepare, the agent for the president may commit, and the agent for the department head may commit. Other examples of configuring the agent utilization data to indicate a quantity of work that has been performed may also be possible.

In embodiments, a quantity of work expected may be indicated at block 612. The first set of agent utilization data may be configured to indicate a first quantity of work that is expected to be performed by the first commit processing agent. Generally, configuring can include setting-up, programming, structuring, constructing, adjusting, or modifying. The first quantity of work may include an amount or measurement of tasks, jobs, processes, resources utilized, or the like needed or desired to be performed when preparing then committing recoverable changes of an agent. The first quantity of work that is expected to be performed may include a predicted or forecasted amount of future work (e.g., with respect to a unit of recovery). The second set of agent utilization data may be configured (e.g., programmed, adjusted, modified) to indicate a second quantity of work that is expected to be performed by the second commit processing agent. The first quantity of work may be compared with the second quantity of work. Comparing can include contrasting, assessing, evaluating, correlating, analyzing, investigating, or examining. It may be calculated that the first quantity of work exceeds the second quantity of work. Calculating can include computing, determining, formulating, or ascertaining. The first quantity of work for the first agent may be greater than the second quantity of work for the second agent. The agent flow arrangement may be determined based on the first quantity of work exceeding the second quantity of work. Determining can include computing, calculating, formulating, generating, or ascertaining. The determining may occur to process the distributed commit operation. Since the first agent will require more work to commit, the first agent may be established as the last agent. The second agent may prepare then commit while the first agent may only commit.

Consider the following example. A video streaming service may utilize agent flow arrangement management to efficiently provide numerous users with movies and television shows. One agent (system A) may locate the requested video for a user while another agent (system B) may locate an available server for streaming. Agent utilization data for the two agents may be collected, including a quantity of work that is expected to be performed by each processing agent. As an example, it may be calculated that system A is expected to require an amount of work of 44 (e.g., on a 1-100 scale) while system B is expected to require an amount of work of 73 (e.g., on the same scale). The two quantities of work may be compared with one another. It may be calculated that system B may require more work than system A since 73 exceeds 44. An appropriate agent flow arrangement may be determined for the streaming service. System B may be established as the last agent since it requires a greater amount of work than system A. The system which locates the requested video (system A) may prepare, the system which locates an available server (system B) may commit, and the system which locates the requested video (system A) may commit. Other examples of configuring the agent utilization data to indicate a quantity of work that is expected to be performed may also occur.

In embodiments, a quantity of recovery log write operations may be indicated at block 613. The first set of agent utilization data may be configured to indicate a first quantity of recovery log write operations by the first commit processing agent with respect to a job unit. Generally, configuring can include setting-up, programming, structuring, constructing, adjusting, or modifying. A quantity of recovery log write operations may include the number of times a query or request has been written to a log (e.g., measured by a count of a number of records). The second set of agent utilization data may be configured to indicate a second quantity of recovery log write operations by the second commit processing agent with respect to the job unit. The first quantity of recovery log write operations may be compared with the second quantity of recovery log write operations. Comparing can include contrasting, assessing, evaluating, correlating, analyzing, investigating, or examining. It may be calculated that the first quantity of recovery log write operations exceeds the second quantity of recovery log write operations. Calculating can include computing, determining, formulating, or ascertaining. The first quantity of recovery log write operations for the first agent may be greater than the second quantity of recovery log write operations for the second agent. The agent flow arrangement may be determined based on the first quantity of recovery log write operations exceeding the second quantity of recovery log write operations. Determining can include computing, calculating, formulating, generating, or ascertaining. The determining may occur to process the distributed commit operation. Since the first agent requires a larger quantity of recovery log write operations to commit, the first agent may be established as the last agent. The second agent may prepare then commit while the first agent may only commit.

Consider the following example. A medical environment may utilize agent flow arrangement management for newly admitted patients. Multiple agents may be used to process a distributed commit operation. As an example, one agent (system C) may reserve a room for the new patient while another agent (system D) may alert a medical professional of the arrival of the new patient. Agent utilization data may be collected for both systems C and D, including a quantity of recovery log write operations. The collected data for system C may indicate that the request to reserve a room may require being written to a recovery log 4 times. The collected data for system D may indicate that the request to alert a medical professional may require being written to a recovery log 2 times. The two quantities may be compared to one another. It may be calculated that the quantity of recovery log write operations for system C (e.g., 4) exceeds the quantity of recovery log write operations for system D (e.g., 2). The agent flow arrangement may be determined based on this calculation. Since system C requires a greater number of recovery log write operations than system D, system C may require more work and may be established as the last agent. When the distributed commit operation is processed, the system to alert a medical professional may prepare, the system to reserve a room may commit, and the system to alert a medical professional may commit. Other examples of configuring the utilization data to indicate a quantity of recovery log write operations may also be possible.

In embodiments, a volume of recovery log data written may be indicated at block 614. The first set of agent utilization data may be configured to indicate a first volume of recovery log data written for the first commit processing agent with respect to a job unit. Generally, configuring can include setting-up, programming, structuring, constructing, adjusting, or modifying. A volume of recovery log data may include the amount or magnitude of queries or requests written to a log (e.g., number of records, volume/amount of data). The second set of agent utilization data may be configured to indicate a second volume of recovery log data written for the second commit processing agent with respect to the job unit. The first volume of recovery log data written may be compared with the second volume of recovery log data written. Comparing can include contrasting, assessing, evaluating, correlating, analyzing, investigating, or examining. It may be calculated that the first volume of recovery log data written exceeds the second volume of recovery log data written. Calculating can include computing, determining, formulating, or ascertaining. The first volume of recovery log data written for the first agent may be greater than the second volume of recovery log data written for the second agent. The agent flow arrangement may be determined based on the first volume of recovery log data written exceeding the second volume of recovery log data written. Determining can include computing, calculating, formulating, generating, or ascertaining. The determining may occur to process the distributed commit operation. Since the first agent has a greater volume of recovery log data, the first agent may be established as the last agent. The second agent may prepare then commit while the first agent may only commit.

Consider the following example. A ticket purchasing service may use agent flow arrangement management to provide users with an efficient method of reserving and purchasing tickets for concerts and sporting events. The ticket purchasing service may utilize multiple systems to process requests. As an example, one agent may include a system which reserves a ticket for a user while another agent may include a system which processes the payment (e.g., credit card information) of a user. Agent utilization data may be collected for both systems, including a volume of recovery log data. The reservation system may require 10 requests to be written to a recovery log while the payment system may require 6 requests to be written to a recovery log. As another example, volume of recovery log data for the reservation system may be calculated as 10 GB while the payment system may only require 6 GB. In both scenarios, the two volumes of recovery log data may be compared with one another and it may be calculated that the volume of recovery log data for the reservation system (e.g., 10) exceeds the volume of recovery log data for the payment system (e.g., 6). The agent flow arrangement may be determined. The reservation system may be established as the last agent since it requires a greater volume of recovery log data (and consequently, a greater amount of work) than the payment system. When the distributed commit operation is executed, the payment system may prepare, the reservation system may commit, and the payment system may commit. Other examples of configuring the set of utilization data to indicate a volume of recovery log data may also be possible.

In embodiments, a quantity of distinct recoverable changes may be indicated at block 616. The first set of agent utilization data may be configured to indicate a first quantity of distinct recoverable changes by the first commit processing agent with respect to a job unit. Generally, configuring can include setting-up, programming, structuring, constructing, adjusting, or modifying. The quantity of distinct recoverable changes may include the number of alterations or adjustments to an agent (e.g., a change to a table, multiple changes to a file). The second set of agent utilization data may be configured to indicate a second quantity of distinct recoverable changes by the second commit processing agent with respect to the job unit. The first quantity of distinct recoverable changes may be compared with the second quantity of distinct recoverable changes. Comparing can include contrasting, assessing, evaluating, correlating, analyzing, investigating, or examining. It may be calculated that the first quantity of distinct recoverable changes exceeds the second quantity of distinct recoverable changes. Calculating can include computing, determining, formulating, or ascertaining. The first quantity of distinct recoverable changes for the first agent may be greater than the second quantity of distinct recoverable changes for the second agent. The agent flow arrangement may be determined based on the first quantity of distinct recoverable changes exceeding the second quantity of distinct recoverable changes. Determining can include computing, calculating, formulating, generating, or ascertaining. The determining may occur to process the distributed commit operation. Since the first agent requires more distinct recoverable changes to commit, the first agent may be established as the last agent. The second agent may prepare then commit while the first agent may only commit.

Consider the following example. A stock market may utilize agent flow arrangement management in a high-frequency trading environment. Multiple agents may be used to process requests for a number of traders. As an example, one agent (system A) may process a request from a trader wishing to sell a share while another agent (system B) may process a request from a trader wishing to buy a share. Agent utilization data may be collected for both agents, including a quantity of distinct recoverable changes. The agent utilization data for system A may indicate 15 changes to a file while the agent utilization data for system B may indicate 24 changes to a file. The quantities of distinct recoverable changes may be compared with one another and it may be calculated that the number of changes for system B exceeds the number of changes for system A. The agent flow arrangement may be determined. Since system B requires a greater number of changes (and by extension, a greater amount of work) than system A, system B may be established as the last agent. A request to sell a share may be prepared, a request to buy a share may be committed, and the request to sell a share may be committed. Other examples of configuring the set of agent utilization data to indicate a quantity of distinct recoverable changes are also possible.

In embodiments, a quantity of locks held may be indicated at block 617. The first set of agent utilization data may be configured to indicate a first quantity of locks held by the first commit processing agent with respect to a job unit. Generally, configuring can include setting-up, programming, structuring, constructing, adjusting, or modifying. A lock may include a method of prevention of alterations or changes to a file. The quantity of locks held may include the number of separate preventions of alterations for recoverable resources (e.g., a lock on a table in a database, a lock on a record in a file). The second set of agent utilization data may be configured to indicate a second quantity of locks held by the second commit processing agent with respect to the job unit. The first quantity of locks held may be compared with the second quantity of locks held. Comparing can include contrasting, assessing, evaluating, correlating, analyzing, investigating, or examining. It may be calculated that the first quantity of locks held exceeds the second quantity of locks held. Calculating can include computing, determining, formulating, or ascertaining. The first quantity of locks held for the first agent may be greater than the second quantity of locks held for the second agent. The agent flow arrangement may be determined based on the first quantity of locks held exceeding the second quantity of locks held. Determining can include computing, calculating, formulating, generating, or ascertaining. The determining may occur to process the distributed commit operation. Since the first agent requires more locks held in order to commit, the first agent may be established as the last agent. The second agent may prepare then commit while the first agent may only commit.

Consider the following example. The travel website described herein may utilize two different agents to process a client request. One agent may include a system which reserves a rental car for a client while another agent may include a system which purchases tickets to a play for the client. Agent utilization data may be collected for both of these agents, including a quantity of locks held to prevent changes to the files. As an example, the car rental system may require 9 locks to reserve a car for a client while the ticket purchasing system may require only 3 locks to purchase tickets to the play. The two quantities of locks may be compared with one another and it may be calculated that the car rental system requires a greater number of locks than the ticket purchasing system. The agent flow arrangement may be determined. The car rental system may be established as the last agent since it requires a greater number of locks (e.g., a greater amount of work) than the ticket purchasing system. When the distributed commit operation is executed, the ticket purchasing system may prepare, the car rental system may commit, and the ticket purchasing system may commit. Other examples of configuring the agent utilization data to indicate a quantity of locks held may also occur.

In embodiments, a quantity of hardware processor usage may be indicated at block 618. The first set of agent utilization data may be configured to indicate a first quantity of hardware processor usage by the first commit processing agent with respect to a job unit. Generally, configuring can include setting-up, programming, structuring, constructing, adjusting, or modifying. The quantity of hardware processor usage may include the number of processor units, the speed of the processor, or the like required to commit an agent. The second set of agent utilization data may be configured to indicate a second quantity of hardware processor usage by the second commit processing agent with respect to a job unit. The first quantity of hardware processor usage may be compared with the second quantity of hardware processor usage. Comparing can include contrasting, assessing, correlating, analyzing, investigating, or examining. It may be calculated that the first quantity of hardware processor usage exceeds the second quantity of hardware processor usage. Calculating can include computing, determining, formulating, or ascertaining. The first quantity of hardware processor usage may be greater than the second quantity of hardware processor usage. The agent flow arrangement may be determined based on the first quantity of hardware processor usage exceeding the second quantity of hardware processor usage. Determining can include computing, calculating, formulating, generating, or ascertaining. The determining may occur to process the distributed commit operation. Since the first agent requires more hardware processor usage to commit, the first agent may be established as the last agent. The second agent may prepare then commit while the first agent may only commit.

Consider the following example. The university registration system described herein may utilize two different agents to process student course registration. One agent may process a request for registration in history classes while another agent may process a request for registration in economics classes. Agent utilization data may be collected for both agents, including a quantity of hardware processor usage. The history agent may require 9 microseconds of CPU time to commit while the economics agent may require 12 microseconds of CPU time to commit. The quantities of hardware processor usage may be compared to one another and it may be calculated that the processor usage for the economics agent exceeds the processor usage for the history agent. The agent flow arrangement may be determined. Since the economics agent requires a greater amount of hardware processor usage (and a greater amount of work) than the history agent, the economics agent may be established as the last agent. When the distributed commit operation is executed, the history agent may prepare, the economics agent may commit, and the history agent may commit. Other examples of configuring the set of agent utilization data to indicate a quantity of hardware processor usage may also be possible.

In embodiments, the agent flow arrangement may be determined at block 661. Generally, determining can include computing, calculating, formulating, generating, or ascertaining. The determining may occur based on quantities of volume of recovery log data written for processing agents with respect to a job unit, quantities of distinct recoverable changes by the processing agents with respect to the job unit, quantities of locks held by the processing agents with respect to the job unit, and quantities of hardware processor usage by processing agents with respect to the job unit. The agent flow arrangement may be based on more than one type of metric data. The agent flow arrangement may utilize an algorithm to weight, rank, or organize the agents based on multiple kinds of metric data. As an example, the volume of recovery log data, the quantity of distinct recoverable changes, the quantity of locks held, and the quantity of hardware processor usage may each be weighted by a percentage (e.g., 25%) to determine which agent should be the last one. The types of metric data may be weighted equally (e.g., 25% each) or differently (e.g., 10% for one type/40% for another type/50% for another type). The algorithm may determine which agent should be the last agent. The algorithm may narrow down several agents to a smaller number of agents (e.g., from 100 to 3) which could be the last agent.

Consider the following example. The ride-sharing application described herein may utilize two agents to match riders and drivers. System A may process requests from riders while system B may process acceptance of requests from drivers. Agent utilization data may be collected for both systems, including a volume of recovery log data, a quantity of distinct recoverable changes, a quantity of locks held, and a quantity of hardware processor usage. System A may require 12 GB of recovery log data written, 4 distinct recoverable changes, 8 locks held, and 20 microseconds of hardware processor usage. System B may require 7 GB of recovery log data written, 5 distinct recoverable changes, 15 locks held, and 16 microseconds of hardware processor usage. The different types of metric data may be weighted to determine the agent flow arrangement. The volume of recovery log data may be weighted 30%, the quantity of distinct recoverable changes may be weight 15%, the quantity of locks held may be weighted 25%, and the hardware processor usage may be weighted 30%. A quantity for amount of work may be calculated using the established weights. System A may require an amount of work equal to $(12*0.30)+(4*0.15)+(8*0.25)+(20*0.30)=12.2$. System B may require an amount of work equal to $(7*0.30)+(5*0.15)+(15*0.25)+(12*0.30)=10.2$. System A requires a greater amount of work than system B, so system A may be established as the last agent. When the distributed commit operation is processed, the acceptance of a driver may be prepared, the request from a rider may be committed, and the acceptance of a driver may be committed. Other examples of using multiple metrics to determine the agent flow arrangement may also be possible.

Method 600 concludes at block 699. As described herein, aspects of method 600 relate to agent flow arrangement management in a distributed commit processing environment. Aspects of method 600 may provide performance or efficiency benefits related to agent flow arrangement management. Aspects may save resources such as bandwidth, processing, or memory. As an example, processing may be saved by determining which agent requires the greater amount of hardware processor usage. The agent that requires the greater amount of hardware processor usage may be established as the last agent. The last agent may only be committed (e.g., as opposed to prepared then committed). Preparing and committing the last agent may require more processing than only committing. As a result, processing may be saved. Other examples of saving processing may also be possible.

Figure 7:
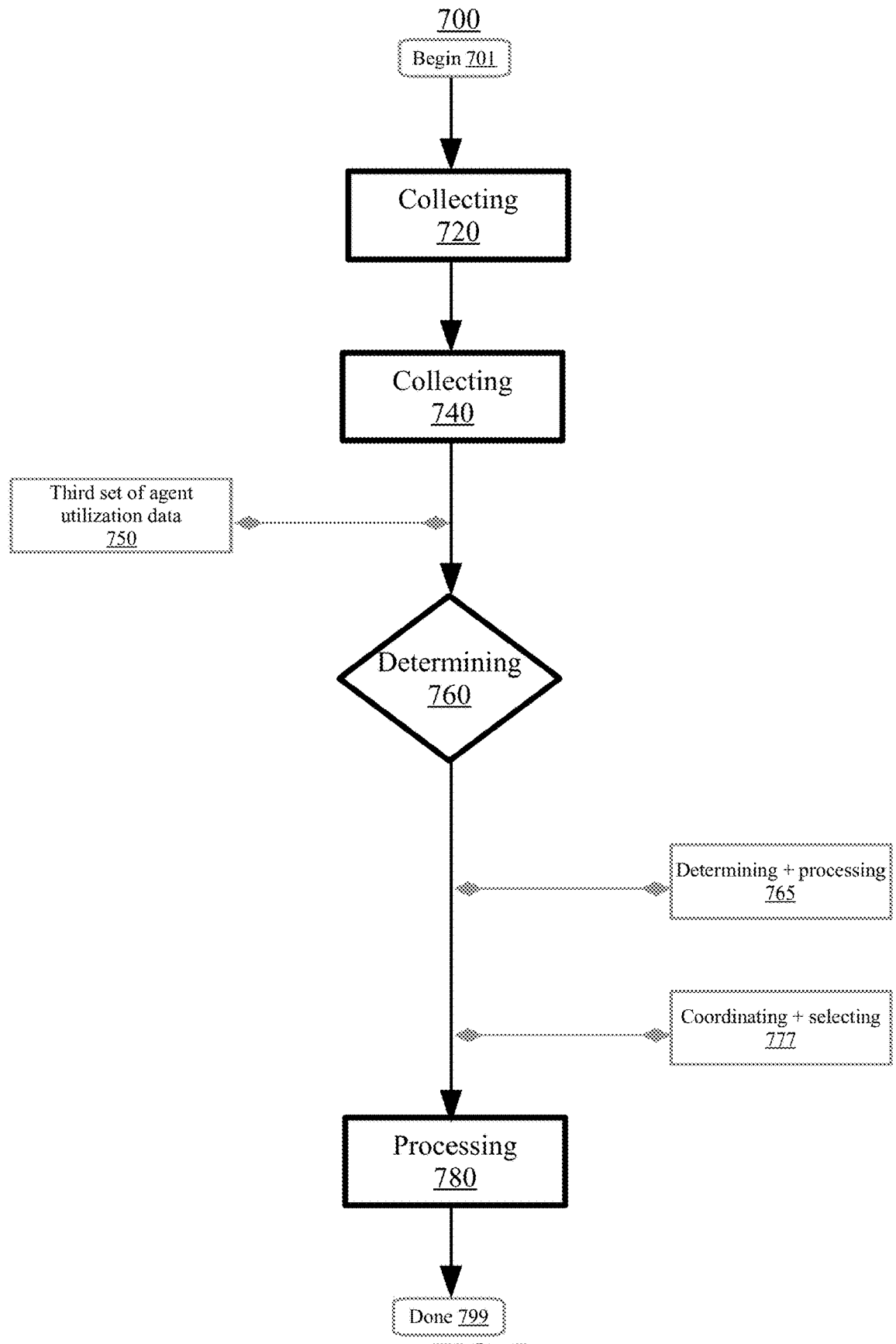
FIG. 7 is a flowchart illustrating a method for agent flow arrangement management in a distributed commit processing environment, according to embodiments.

FIG. 7 is a flowchart illustrating a method for agent flow arrangement management in a distributed commit processing environment, according to embodiments. Aspects may be similar or the same as aspects of method 400/500/600, and aspects may be used interchangeably. The method 700 may begin at block 701. At block 720, a first set of agent utilization data may be collected. The collecting may occur with respect to a first commit processing agent. The collecting may occur in the distributed commit processing environment. At block 740, a second set of agent utilization may be collected. The collecting may occur with respect to a second commit processing agent. The collecting may occur in the distributed commit processing environment.

In embodiments, a third set of agent utilization data may be collected at block 750. Generally, collecting can include gathering, accumulating, acquiring, or obtaining. The collecting may occur with respect to a third commit processing agent. The third set of agent utilization data may include facts, statistics, quantities, or characteristics of a third agent. The collecting may occur in the distributed commit processing environment. The agent flow arrangement may be determined. Determining can include formulating, computing, resolving, or ascertaining. The determining may occur based on the first value (with respect to the first set of agent utilization data) exceeding a third value (with respect to the third set of agent utilization data). The determining may occur as part of processing the distributed commit operation. The agent flow arrangement may have the first commit processing agent subsequent to the third commit processing agent. If the amount of work needed to commit a first agent is greater than the amount of work needed to commit a third agent, then the third agent may be arranged to occur before the first agent. The distributed commit operation may be processed. Generally, processing can include performing, carrying-out, initiating, launching, instantiating, implementing, enacting, running, or executing. The processing may occur using the agent flow arrangement (which has the first commit processing agent subsequent to the third commit processing agent). As an example, if the first commit processing agent requires a greater amount of work than the third commit processing agent, then the first commit processing agent may be established as the last agent and instructed to commit. The processing may occur in the distributed commit processing environment.

Consider the following example. The human resources department described herein may utilize three agents to approve of the hiring of a new employee. System A may process the approval (e.g., acknowledgement of contract, official signature) of the company president, system B may process the approval of the department head, and system C may process the approval of the newly hired individual. Agent utilization data may be collected for each system. As an example, system A may require an amount of work of 7 (e.g., on a 1-10 scale), system B may require an amount of work of 4, and system C may require an amount of work of 2. The agent flow arrangement may be determined. Since system A requires a greater amount of work than system C, system A may be established as the last agent. When the distributed commit operation is processed, systems B and C may prepare, system A may commit, and systems B and C may commit. Other examples of collecting a third set of agent utilization data may also be possible.

At block 760, an agent flow arrangement may be determined. The determining may occur based on a first value (with respect to the first set of agent utilization data) exceeding a second value (with respect to the second set of agent utilization data). The agent flow arrangement may have the first commit processing agent subsequent to the second commit processing agent. The determining may occur to process a distributed commit operation.

In embodiments, determining and processing may occur at block 765. The agent flow arrangement may be determined based on the second value (with respect to the second set of agent utilization data) exceeding the third value (with respect to the third set of agent utilization data). Determining can include formulating, computing, resolving, or ascertaining. The determining may occur to process the distributed commit operation. The agent flow arrangement may have the second commit processing agent subsequent to the third commit processing agent. If the amount of work needed to commit a second agent is greater than the amount of work needed to commit a third agent, then the third agent may be arranged to occur before the second agent. The distributed commit operation may be processed in the distributed commit processing environment. Generally, processing can include performing, carrying-out, initiating, launching, instantiating, implementing, enacting, running, or executing.

The processing may occur using the agent flow arrangement which has the second commit processing agent subsequent to the third commit processing agent. As an example, if the second commit processing agent requires a greater amount of work than the third commit processing agent, then the second commit processing agent may be established as the last agent and instructed to commit. As another example, the first commit processing agent may require the greatest amount of work followed by the second commit processing agent followed by the third commit processing agent. The first commit processing agent may be established as the last agent and instructed to commit. The third commit processing agent may prepare first, followed by second commit processing agent preparing. The first commit processing agent may commit.

Consider the following example. In the human resources example described herein, system A may require an amount of work of 7 (e.g., on a 1-10 scale), system B may require an amount of work of 4, and system C may require an amount of work of 2. The agent flow arrangement may be determined accordingly. System A may be established as the last agent as described herein. With respect to systems B and C, the amount of work required to commit system B is greater than the amount of work required to commit system C. The agent flow arrangement may include system B subsequent to system C. The established arrangement may include system C, then system B, then finally system A as the last agent. When the distributed commit operation is processed, system C may prepare first, followed by system B preparing. System A may commit, followed by systems B and C committing. Other examples of determining the agent flow arrangement based on the second value exceeding the third value may also occur.

In embodiments, coordinating and selecting may occur at block 777. The agent flow arrangement may be coordinated by the first commit processing agent. Coordinating may include adapting, adjusting, organizing, ascertaining, determining, communicating, resolving, or arranging. The coordinating may occur as part of processing the distributed commit operation. The first commit processing agent may be selected by the first commit processing agent (e.g., it selects itself) as the coordinating agent. Selecting may include choosing, picking, electing, specifying, or designating. In certain embodiments, the first processing agent may be established as the coordinating agent. The first processing agent may calculate or detect that it is the agent with the larger metrics with respect to the amount of work required to commit. The first processing agent (e.g., the coordinating agent) may select itself as the last agent. In the travel agency example described herein, the hotel room system may be the established coordinator. Since the hotel room system requires a greater amount of work to commit than the airline system, the hotel room system may select itself as the last (e.g., coordinating) agent.

In various embodiments, a second processing agent may originate as the coordinating agent. The second processing agent may determine that the first processing agent should be the last agent since it requires a greater amount of work to commit. The second processing agent (e.g., the coordinating agent) may transfer the role of coordinator to the first agent. The first processing agent may accept the role of coordinator, select itself as the last agent, and perform other aspects as described herein.

Consider the following example. The video streaming service described herein may utilize agent flow arrangement management to provide users with movies and television shows. One agent (system A) may locate the requested video for a user while another agent (system B) may locate an available server for streaming. System B may be the established coordinator for the distributed commit operation. System B may determine that system A requires a greater amount of work to commit (e.g., system B requires 4 on a 1-10 scale while system A requires 7 on a 1-10 scale). System B may transfer the role of coordinating agent to system A. Since system A requires a greater amount of work in order to commit, system A may establish itself as the last agent. When the distributed commit operation is executed, system B may prepare, system A may commit, and system B may commit. Other examples of coordinating the agent flow arrangement may also be possible.

At block 780, the distributed commit operation may be processed. The processing may occur using the agent flow arrangement. The agent flow arrangement may have the first commit processing agent subsequent to the second commit processing agent. The processing may occur in the distributed commit processing environment. Method 700 concludes at block 799. As described herein, aspects of method 700 relate to agent flow arrangement management in a distributed commit processing environment. Aspects of method 700 may provide performance or efficiency benefits related to agent flow arrangement management. Aspects may save resources such as bandwidth, processing, or memory. As an example, choosing a first agent (e.g., from a group containing a second and third agent) as the last agent may save memory. The first agent may require more work to commit than the second and third agents. The second and third agents may prepare then commit while the first agent may only commit. Committing and not preparing the first agent may require less memory than preparing and committing the first agent. Other examples of saving memory may also be possible.

Figure 8:
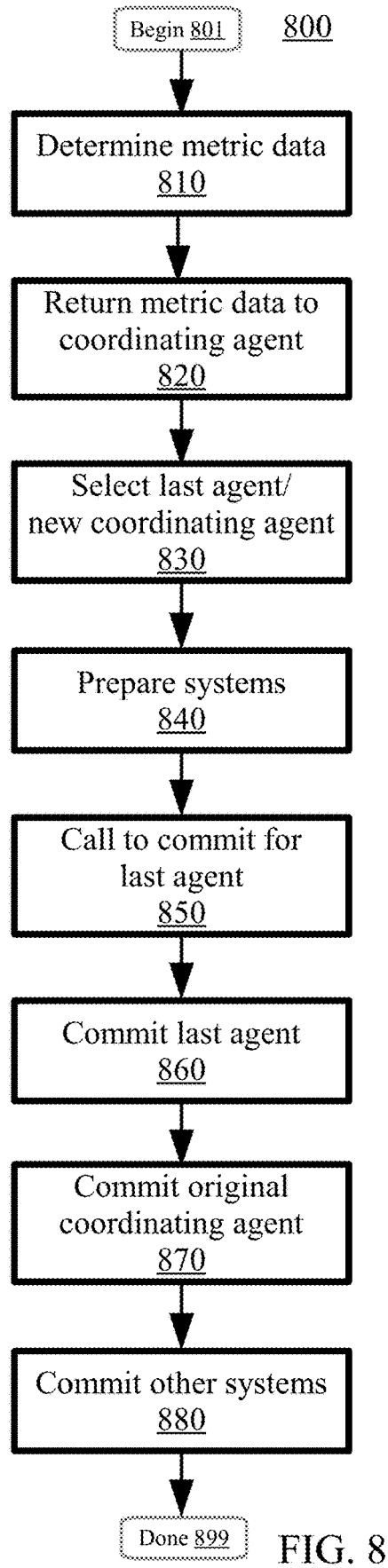
FIG. 8 shows an example system for agent flow arrangement management in a distributed commit processing environment, according to embodiments.

FIG. 8 shows an example system for agent flow arrangement management in a distributed commit processing environment, according to embodiments. The example system may consist of four agents, A, B, C, and D. System A may be the established coordinator for the 2PC. Systems (B, C, D) may report metric information back to the coordinating agent (A) on the nature of recoverable changes required in order to commit. The metric information may include number of log records written, volume of log data written, number of separate locks held, number of separate recoverable changes, or the like. The metric data may be recorded (e.g., in memory, on external media, written to a queue) within the calling system so when a commit operation is instructed to begin, the data is available for the next phase of the inventive logic to utilize. The 2PC may utilize metric data when determining the agent to select as the last agent for the distributed commit operation. In this case, system C may be selected as the last agent. Metrics from each system may be compared (including the metrics of the coordinating agent A) and the other system which has the most work to do when committing may be selected as the last agent. The system may avoid having to perform both a separate prepare and then commit operation.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for agent flow arrangement management in a distributed two-phase commit processing environment, the method comprising:
   collecting, in the distributed two-phase commit processing environment, a first set of agent utilization data with respect to a first commit processing agent;
   collecting, in the distributed two-phase commit processing environment, a second set of agent utilization data with respect to a second commit processing agent, wherein the second commit processing agent is associated with a different transaction than a transaction associated with the first commit processing agent, and wherein the different transaction and the transaction associated with the first commit processing agent each include a plurality of work operations to complete a corresponding transaction;
   determining, based on a first value with respect to the first set of agent utilization data exceeding a second value with respect to the second set of agent utilization data, an agent flow arrangement to process a distributed commit operation, wherein the agent flow arrangement has the first commit processing agent subsequent to the second commit processing agent;
   processing, in the distributed two-phase commit processing environment, the distributed commit operation using the agent flow arrangement which has the first commit processing agent subsequent to the second commit processing agent; and
   wherein determining the agent flow arrangement is based on,
      quantities of volume of recovery log data written for processing agents with respect to a job unit,
      quantities or distinct recoverable changes by the processing agents with respect to the job unit,
      quantities of locks held by the processing agents with respect to the job unit, and
      quantities of hardware processor usage by processing agents with respect to the job unit.

2. The method of claim 1, further comprising:
   configuring the distributed commit operation to include a prepare operation for the second commit processing agent but not the first commit processing agent.

3. The method of claim 1, further comprising:
   arranging, in the agent flow arrangement, the first commit processing agent to be a last agent to process the distributed commit operation.

4. The method of claim 1, further comprising:
   configuring the first set of agent utilization data to indicate a first quantity of work that has been performed by the first commit processing agent;
   configuring the second set of agent utilization data to indicate a second quantity of work that has been performed by the second commit processing agent;
   comparing the first quantity of work with the second quantity of work;
   calculating that the first quantity of work exceeds the second quantity of work; and
   determining, based on the first quantity of work exceeding the second quantity of work, the agent flow arrangement to process the distributed commit operation.

5. The method of claim 1, further comprising:
   configuring the first set of agent utilization data to indicate a first quantity of work that is expected to be performed by the first commit processing agent;
   configuring the second set of agent utilization data to indicate a second quantity of work that is expected to be performed by second the commit processing agent;
   comparing the first quantity of work with the second quantity of work;
   calculating that the first quantity of work exceeds the second quantity of work; and
   determining, based on the first quantity of work exceeding the second quantity of work, the agent flow arrangement to process the distributed commit operation.

6. The method of claim 1, further comprising:
   configuring the first set of agent utilization data to indicate a first volume of recovery log data written for the first commit processing agent with respect to a job unit;
   configuring the second set of agent utilization data to indicate a second volume of recovery log data written for the second commit processing agent with respect to the job unit;
   comparing the first volume of recovery log data written with the second volume of recovery log data written;
   calculating that the first volume of recovery log data written exceeds the second volume of recovery log data written; and
   determining, based on the first volume of recovery log data written exceeding the second volume of recovery log data written, the agent flow arrangement to process the distributed commit operation.

7. The method of claim 1, further comprising:
   configuring the first set of agent utilization data to indicate a first quantity of distinct recoverable changes by the first commit processing agent with respect to a job unit;
   configuring the second set of agent utilization data to indicate a second quantity of distinct recoverable changes by the second commit processing agent with respect to the job unit;
   comparing the first quantity of distinct recoverable changes with the second quantity of distinct recoverable changes;
   calculating that the first quantity of distinct recoverable changes exceeds the second quantity of distinct recoverable changes; and
   determining, based on the first quantity of distinct recoverable changes exceeding the second quantity of distinct recoverable changes, the agent flow arrangement to process the distributed commit operation.

8. The method of claim 1, further comprising:
   configuring the first set of agent utilization data to indicate a first quantity of locks held by the first commit processing agent with respect to a job unit;
   configuring the second set of agent utilization data to indicate a second quantity of locks held by the second commit processing agent with respect to the job unit;
   comparing the first quantity of locks held with the second quantity of locks held;
   calculating that the first quantity of locks held exceeds the second quantity of locks held; and
   determining, based on the first quantity of locks held exceeding the second quantity of locks held, the agent flow arrangement to process the distributed commit operation.

9. The method of claim 1, further comprising:
configuring the first set of agent utilization data to indicate a first quantity of hardware processor usage by the first commit processing agent with respect to a job unit;
configuring the second set of agent utilization data to indicate a second quantity of hardware processor usage by the second commit processing agent with respect to the job unit;
comparing the first quantity of hardware processor usage with the second quantity of hardware processor usage;
calculating that the first quantity of hardware processor usage exceeds the second quantity of hardware processor usage; and
determining, based on the first quantity of hardware processor usage exceeding the second quantity of hardware processor usage, the agent flow arrangement to process the distributed commit operation.

10. The method of claim 1, further comprising:
coordinating, by the first commit processing agent, the agent flow arrangement to process the distributed commit operation; and
selecting, by the first commit processing agent, the first commit processing agent to be a last agent to process the distributed commit operation.

11. The method of claim 1, further comprising:
avoiding a prepare operation for the first commit processing agent.

12. The method of claim 1, further comprising:
collecting, in the distributed two-phase commit processing environment, a third set of agent utilization data with respect to a third commit processing agent;
determining, based on the first value with respect to the first set of agent utilization data exceeding a third value with respect to the third set of agent utilization data, the agent flow arrangement to process the distributed commit operation, wherein the agent flow arrangement has the first commit processing agent subsequent to the third commit processing agent; and
processing, in the distributed two-phase commit processing environment, the distributed commit operation using the agent flow arrangement which has the first commit processing agent subsequent to the third commit processing agent.

13. The method of claim 12, further comprising:
determining, based on the second value with respect to the second set of agent utilization data exceeding the third value with respect to the third set of agent utilization data, the agent flow arrangement to process the distributed commit operation, wherein the agent flow arrangement has the second commit processing agent subsequent to the third commit processing agent; and
processing, in the distributed two-phase commit processing environment, the distributed commit operation using the agent flow arrangement which has the second commit processing agent subsequent to the third commit processing agent.

14. The method of claim 1, further comprising:
executing, in a dynamic fashion to streamline agent flow arrangement management in the distributed two-phase commit processing environment, each of:
the collecting, the collecting, the determining, and the processing.

15. The method of claim 1, further comprising:
executing, in an automated fashion without user intervention, each of:
the collecting, the collecting, the determining, and the processing.

16. The method of claim 1, further comprising:
configuring the first set of agent utilization data to indicate a first quantity of work associated with the first commit processing agent;
configuring the second set of agent utilization data to indicate a second quantity of work associated with second the commit processing agent;
comparing the first quantity of work with the second quantity of work;
calculating that the first quantity of work exceeds the second quantity of work;
determining, based on the first quantity of work exceeding the second quantity of work, the agent flow arrangement to process the distributed commit operation; and
arranging, in the agent flow arrangement, the first commit processing agent to be a last agent to process the distributed commit operation.

17. A system for agent flow arrangement management in a distributed two-phase commit processing environment, the system comprising:
a memory having a set of computer readable computer instructions, and
a processor for executing the set of computer readable instructions, the set of computer readable instructions including instructions to:
collect, in the distributed two-phase commit processing environment, a first set of agent utilization data with respect to a first commit processing agent;
collect, in the distributed two-phase commit processing environment, a second set of agent utilization data with respect to a second commit processing agent, wherein the second commit processing agent is associated with a different transaction than a transaction associated with the first commit processing agent, and wherein the different transaction and the transaction associated with the first commit processing agent each include a plurality of work operations to complete a corresponding transaction;
determine, based on a first value with respect to the first set of agent utilization data exceeding a second value with respect to the second set of agent utilization data, an agent flow arrangement to process a distributed commit operation, wherein the agent flow arrangement has the first commit processing agent subsequent to the second commit processing agent;
process, in the distributed two-phase commit processing environment, the distributed commit operation using the agent flow arrangement which has the first commit processing agent subsequent to the second commit processing agent; and
wherein instructions to determine the agent flow arrangement is based on:
quantities of volume of recovery log data written for processing agents with respect to a job unit,
quantities of distinct recoverable changes by the processing agents with respect to the job unit,
quantities of locks held by the processing agents with respect to the job unit, and
quantities of hardware processor usage by processing agents with respect to the job unit.

18. A computer program product for agent flow arrangement management in a distributed two-phase commit processing environment, the computer program product comprising a computer readable storage medium having program instructions embodied therewith, wherein the computer readable storage medium is not a transitory signal per se, the program instructions executable by a processor to cause the processor to perform a method comprising:

collecting, in the distributed two-phase commit processing environment, a first set of agent utilization data with respect to a first commit processing agent;

collecting, in the distributed two-phase commit processing environment, a second set of agent utilization data with respect to a second commit processing agent, wherein the second commit processing agent is associated with a different transaction than a transaction associated with the first commit processing agent, and wherein the different transaction and the transaction associated with the first commit processing agent each include a plurality of work operations to complete a corresponding transaction;

determining, based on a first value with respect to the first set of agent utilization data exceeding a second value with respect to the second set of agent utilization data, an agent flow arrangement to process a distributed commit operation, wherein the agent flow arrangement has the first commit processing agent subsequent to the second commit processing agent;

processing, in the distributed two-phase commit processing environment, the distributed commit operation using the agent flow arrangement which has the first commit processing agent subsequent to the second commit processing agent; and wherein determining the agent flow arrangement is based on:
quantities of volume of recovery log data written for processing agents with respect to a job unit,
quantities of distinct recoverable changes by the processing agents with respect to the job unit,
quantities of locks held by the processing agents with respect to the job unit, and
quantities of hardware processor usage by processing agents with respect to the job unit.

19. The system of claim 17 wherein the set of computer instructions further comprises instructions to:
execute, in an automated fashion without user intervention, each of:
the collecting, the collecting, the determining, and the processing.

20. The system of claim 17 wherein the set of computer instructions further comprises instructions to:
configure the distributed commit operation to include a prepare operation for the second commit processing agent but not the first commit processing agent.

* * * * *